US007636845B2

(12) United States Patent
Jeon et al.

(10) Patent No.: US 7,636,845 B2
(45) Date of Patent: Dec. 22, 2009

(54) SYSTEM FOR PREVENTING IP ALLOCATION TO CLONED MOBILE COMMUNICATION TERMINAL

(75) Inventors: Yun-sik Jeon, Seoul (KR); Young-rok Kim, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 412 days.

(21) Appl. No.: 11/580,741

(22) Filed: Oct. 12, 2006

(65) Prior Publication Data

US 2007/0140196 A1  Jun. 21, 2007

(30) Foreign Application Priority Data

Dec. 15, 2005  (KR)  ...................... 10-2005-0123711

(51) Int. Cl.
*H04L 29/06* (2006.01)
(52) U.S. Cl. ........................ 713/171; 380/270; 380/277; 726/28
(58) Field of Classification Search .................. 713/171, 713/168; 380/249, 255, 270; 455/1–73, 455/95, 437, 439; 726/5
See application file for complete search history.

(56) References Cited

U.S. PATENT DOCUMENTS

| 5,608,778 | A  | * | 3/1997 | Partridge, III | ................ 455/411 |
| 6,173,173 | B1 | * | 1/2001 | Dean et al. | .................... 455/410 |
| 2002/0152380 | A1 | * | 10/2002 | O'Shea et al. | ............... 713/170 |
| 2002/0174335 | A1 | * | 11/2002 | Zhang et al. | ................ 713/168 |
| 2002/0186845 | A1 | * | 12/2002 | Dutta et al. | .................. 380/247 |
| 2003/0091013 | A1 | * | 5/2003 | Song et al. | ................... 370/338 |
| 2003/0108195 | A1 | * | 6/2003 | Okada et al. | ................... 380/37 |
| 2004/0205211 | A1 | * | 10/2004 | Takeda et al. | ................ 709/230 |
| 2005/0149442 | A1 | * | 7/2005 | Adams et al. | .................. 705/51 |
| 2006/0075242 | A1 | * | 4/2006 | Aissi et al. | .................... 713/176 |
| 2007/0043947 | A1 | * | 2/2007 | Mizikovsky et al. | ........ 713/172 |
| 2007/0083470 | A1 | * | 4/2007 | Bonner et al. | .................. 705/51 |
| 2007/0127420 | A1 | * | 6/2007 | Tjandra | ...................... 370/338 |
| 2007/0198835 | A1 | * | 8/2007 | Mudhar | ...................... 713/171 |

FOREIGN PATENT DOCUMENTS

KR  10-2005-0072508  7/2005

OTHER PUBLICATIONS

Doo Ho Choi, A secure mobile IP authentication based on identification protocal, Nov. 18-19, 2004, Intelligent signal processing and communication systems, 2004.*
Christopher Wingert, Mullaguru Naidu, CDMA 1XRTT Security, Aug. 2002, http://65.77.116.161/technology/cdma_technology/white_papers/cdma_1x_security_overview.pdf.*

* cited by examiner

*Primary Examiner*—Emmanuel L Moise
*Assistant Examiner*—Abu Sholeman
(74) *Attorney, Agent, or Firm*—H.C. Park & Associates, PLC (57) ABSTRACT

A system for preventing IP (Internet Protocol) allocation to a cloned mobile communication terminal is provided, including: a mobile communication terminal generating a hash value obtained by hashing a user key inputted by a user and an ESN (Electronic Serial Number) with a hash function, and transmitting the hash value to an HA (Home Agent) of a mobile communication system; and an HA registering the hash value transmitted from the mobile communication terminal, comparing a hash value included in an IP registration request message (RRQ) with the registered hash value at the IP registration request of the mobile communication terminal, and performing an IP registration process if the compared values match.

10 Claims, 7 Drawing Sheets

SYSTEM FOR PREVENTING IP ALLOCATION TO CLONED MOBILE COMMUNICATION TERMINAL

This application claims the priority of Korean Patent Application No. 2005-123711, filed on Dec. 15, 2005, in the Korean Intellectual Property Office, the disclosure of which is incorporated herein in its entirety by reference.

BACKGROUND OF THE INVENTION

1. Field of the Invention

The present invention relates to a system for preventing IP (Internet Protocol) allocation to a cloned mobile communication terminal and, more particularly, to a technique of preventing a cloned mobile communication terminal from accessing a network.

2. Description of Related Art

Figure 1:
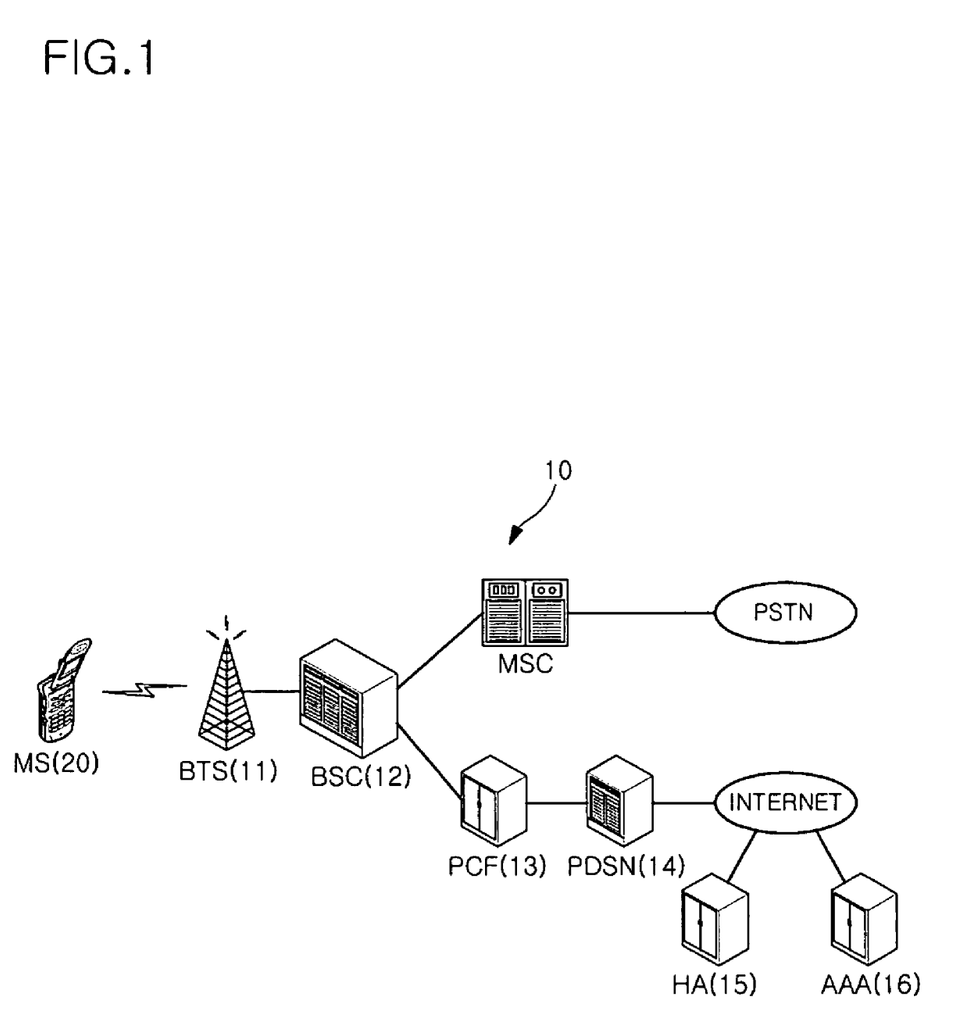
FIG. 1 is a mobile communication system for providing packet data services.

FIG. 1 illustrates a mobile communication system for providing packet data services.

A mobile communication system 10 includes a base transceiver station (BTS) 11, a base station controller (BSC) 12, a packet control function (PCF) 13, a packet data serving node (PDSN) 14, a home agent (HA) 15, and an authentication, authorization and accounting (AAA) 16.

The BTS 11 exchanges voice and data with a mobile station (MS) 20 over wireless interface.

The BSC 12 is responsible for the exchange of messages towards the MSC (mobile switching center) and the BTS 11. Traffic and signaling transferred between the MSC and MS 20 will usually pass transparently through the BSC 12.

The PCF 13 controls the transmission of packets between the BSC 12 and the PDSN 14.

The PDSN 14 is responsible for the establishment, maintenance and termination of a link layer session towards the MS 20.

The HA 15 is the function within the mobile IP architecture responsible for routing data to mobile stations currently attached to a foreign network. This is achieved through a tunneling process in which a Care-of-Address (CoA) is used to deliver the data to the mobile station 20. The HA 15 communicates with the AAA 16 for the purpose of user authentication.

The AAA 16 is a term for a framework for intelligently controlling access to computer resources, enforcing policies, auditing usage, and providing the information necessary to bill for services. These combined processes are considered important for effective network management and security.

The MS 20 is required to access the Internet through the mobile IP to use Mobile Browser, Multimedia Messaging Service (MMS), or BREW applications.

The HA 15 is responsible for the registration of mobile IP. In more detail, when the MS 20 sends an IP registration request message (RRQ) to the HA 15, the HA 15 checks whether or not there is an IP address available. When there is an IP address available, the HA 15 allocates the IP address to the MS 20 and sends an IP registration reply message (RRP) to the MS 20, thereby completing IP registration. The above-mentioned IP registration process is well known in the art and a detailed description thereof will thus be omitted herein.

According to the prior art, a hash value is used as MN-HA Shared Secret or MN-AAA Shared Secret used as a password for authentication during mobile IP access. The hash value is obtained by hashing an electronic serial number (ESN) or an authentication key issued to a user in a mobile communication system with a hash function.

Accordingly, if the hash value is copied to a memory unit of a cloned mobile station or is generated using specification of a manufacturer, the hash value is compared with a hash value stored in the mobile communication system and IP is allocated to the cloned mobile station during an IP registration process. As a result, it is not possible to prevent the cloned mobile station from accessing the network.

SUMMARY OF THE INVENTION

The present invention provides a system for preventing IP (Internet Protocol) allocation to a cloned mobile communication terminal by generating a hash value required for user authentication during a mobile IP registration process from a user key known only to a user and registering the hash value in a home agent of a mobile communication system so that a fraudulent user cannot copy the hash value required for authentication during a mobile IP access process to the fraudulent user's mobile communication terminal.

According to an aspect of the present invention, there is provided a system for preventing IP (Internet Protocol) allocation to a cloned mobile communication terminal, including: a mobile communication terminal generating a hash value obtained by hashing a user key inputted by a user and an ESN (Electronic Serial Number) with a hash function, and transmitting the hash value to an HA (Home Agent) of a mobile communication system; and an HA registering the hash value transmitted from the mobile communication terminal, comparing a hash value included in an IP registration request message (RRQ) with the registered hash value at the IP registration request of the mobile communication terminal, and performing an IP registration process if the compared values match.

The mobile communication terminal may include a mobile communication terminal processing module including: a storage part storing a first variable having network access identification information, a second variable having a hash value, and a third variable set to 'TRUE' or 'FALSE' according to whether or not the hash value is registered; an initialization part setting the first and second variables to 'NULL' and setting the third variable to 'FALSE' when the ESN is input; a user key input part providing UI (User Interface) to a user and receiving a user key from the user through the UI when the first and second variables are set to 'NULL'; a hash value generation part generating a hash value by hashing the user key inputted by the user key input part and the ESN with a hash function, and setting the first and second variables to the generated hash value; an IP registration request part transmitting an IP registration request message (RRQ) including the first and second variables to the HA; and a hash value registration check part storing network access identification information, which is predetermined between the mobile communication terminal and the HA, in the first variable and changing the third variable to 'TRUE' when an IP registration reply message (RRP) transmitted from the HA is a message indicating 'registration of hash value'.

The HA may include an HA processing module including: a storage part storing a fourth variable having network access identification information and a fifth variable having a hash value; a hash value inspection part inspecting the fifth variable when the IP registration request message is received from the mobile communication terminal; a hash value registration part setting the first variable included in the IP registration request message to the fifth variable when the fifth variable is determined to be 'NULL' by the hash value inspection part and transmitting an IP registration reply message indicating 'registration of hash value' to the mobile communication terminal; a cloned mobile communication terminal determination part comparing the first variable included in the IP registration request message and the fourth variable stored in the storage part with the second variable included in the IP registration request message and the fifth variable stored in the storage part, respectively, when the fifth variable is not determined to be 'NULL' by the hash value inspection part, and determining the mobile communication terminal as normal if the compared variables match, or determining the mobile communication terminal as cloned if the compared variables do not match; and an IP registration processing part performing an IP registration process for the mobile communication terminal if the mobile communication terminal is determined as normal, or not performing an IP registration process for the mobile communication terminal if the mobile communication terminal is determined as cloned.

The mobile communication terminal processing module may further include a hash value processing part that requests a change of a hash value at the hash value change request of a user when the third variable is determined to be 'TRUE' by providing UI (User Interface) to the user, receiving a registered user key from the user through the UI, comparing the inputted user key with the second variable, setting the first variable to the second variable if the user key and the second variable match, and transmitting the IP registration request message including the first and second variables to the HA of the mobile communication system.

The HA processing module may further include a hash value change part changing the fifth variable to 'NULL' when the first variable included in the IP registration request message received from the mobile communication terminal and the fifth variable match, and transmitting an IP registration reply message indicating 'approval of change of hash value' to the mobile communication terminal.

The hash value processing part may further provide the UI to the user and receive a new user key from the user through the UI according to the IP registration reply message indicating 'approval of change of hash value' transmitted from the HA, generate a hash value by hashing the user key and the ESN with the hash function, set the first and second variables to the generated hash value, and set the third variable to 'FALSE'.

The hash value processing part may further transmit the IP registration request message including the first and second variables to the HA, and, if the IP registration reply message transmitted from the HA is a message indicating 'registration of hash value', store network access identification information, which is predetermined between the mobile communication terminal and the HA, in the first variable, and change the third variable to 'TRUE'.

When the hash value change part receives the IP registration request message from the mobile communication terminal, the hash value change part may further inspect the fifth variable, set the first variable included in the IP registration request message to the fifth variable when the fifth variable is 'NULL', and transmit an IP registration reply message indicating 'registration of hash value' to the mobile communication terminal.

Input data processed by the hash function may further include a MIN (Mobile Identification Number).

Input data processed by the hash function may further include a MDN (Mobile Directory Number) for identifying a mobile communication terminal in a provider's network and a roaming partner's network.

The hash function may be HMAC-MD5 (Hashed Message Authentication Code with MD5).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

A system for preventing IP allocation to a cloned mobile communication terminal according to an embodiment of the present invention includes a mobile communication terminal processing module 100, which is software executed in a mobile communication terminal, and a home agent processing module 200, which is software executed in a home agent (HA) of a mobile communication system.

The mobile communication terminal processing module 100 generates a hash value from a user key and an electronic serial number (ESN) with a hash function, and transmits the hash value to the HA of the mobile communication system.

The HA processing module 200 registers the hash value transmitted from the mobile communication terminal. When the mobile communication terminal sends an IP registration request message (RRQ) to the HA processing module 200, the HA processing module 200 compares a hash value included in the IP registration request message with the registered hash value. If both of the hash values match, the HA processing module 200 performs an IP registration process. If not, it does not perform the IP registration process.

Accordingly, since the hash value necessary for user authentication is generated from a user key known only to a user and is registered in the HA of the mobile communication system, a cloned mobile communication terminal is determined as clone in an authentication process performed prior to a mobile IP registration process, thus preventing the cloned mobile communication terminal from accessing a network.

Figure 2:
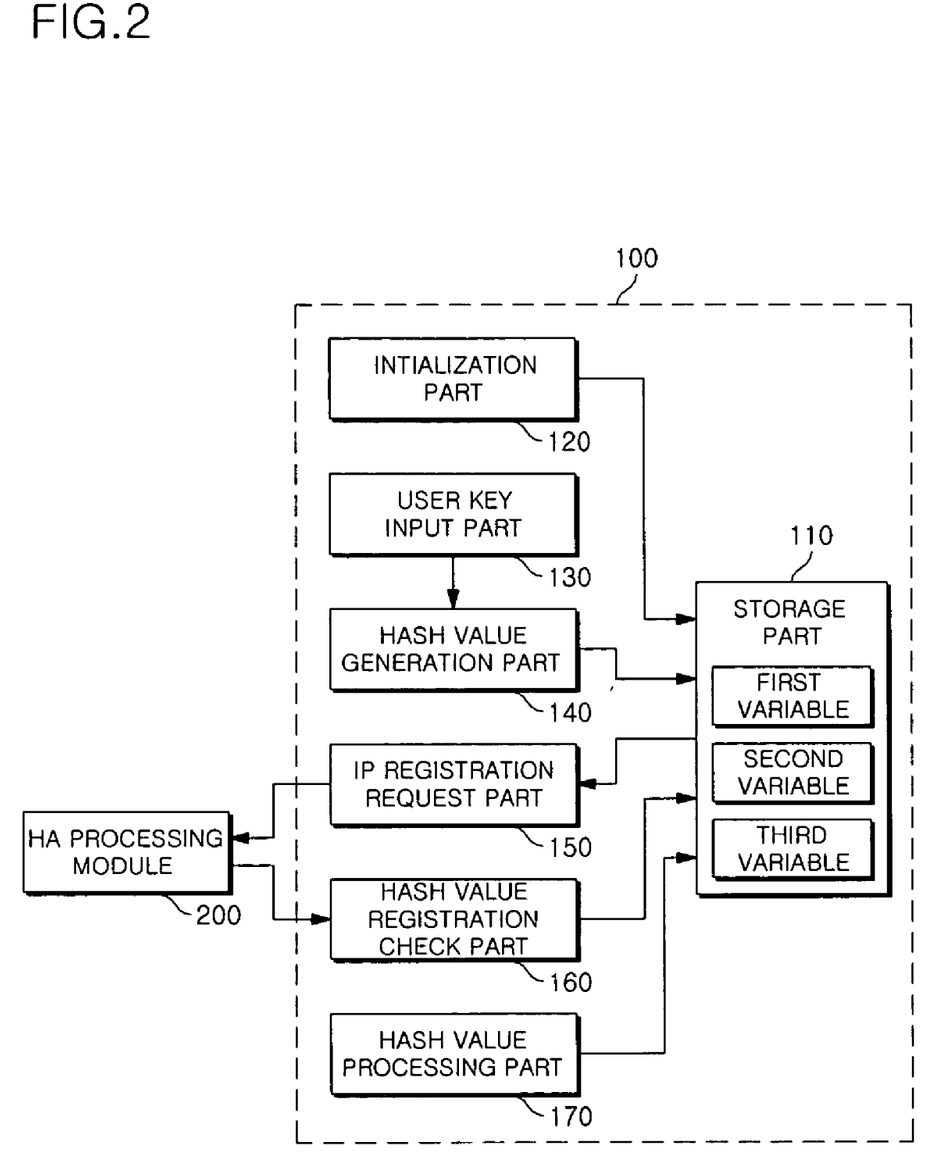
FIG. 2 is a block diagram of a mobile communication terminal processing module in a system for preventing IP allocation to a cloned mobile communication terminal according to an embodiment of the present invention.

FIG. 2 is a block diagram of a mobile communication terminal processing module in a system for preventing IP allocation to a cloned mobile communication terminal according to an embodiment of the present invention.

The mobile communication terminal processing module 100 includes a storage part 110, an initialization part 120, a user key input part 130, a hash value generation part 140, an IP registration request part 150, and a hash value registration check part 160.

The storage part 110 stores a first variable (NAI: network access identification), which stores information concerning network access identification, a second variable (MASS: MN-AAA(HA) shared secret), which stores a hash value, and a third variable (Personal_Auth), which is set to 'TRUE' or 'FALSE' according to whether or not the hash value is registered.

A mobile communication terminal is initially configured by default such that the first and second variables are set to 'NULL' and the third variable is set to 'FALSE'.

The initialization part 120 initializes the first and second variables to 'NULL' and the third variable to 'FALSE' when the ESN is input.

In more detail, when the ESN is newly recorded on the mobile communication terminal, the mobile communication terminal processing module 100 initializes the first and second variables to 'NULL' and the third variable to 'FALSE' by means of the initialization part 120.

When the first and second variables are 'NULL', the user key input part 130 provides user interface (UI) to a user so that the user can input a user key through the UI.

When the user attempts to access a network through the mobile communication terminal, the mobile communication terminal processing module 100 provides the UI to the user by means of the user key input part 130 and receives a user key from the user if the first and second variables are 'NULL', i.e., if the mobile communication terminal is newly purchased or the ESN is newly recorded on the mobile communication terminal.

The user key is a combination of consecutive keys which is known only to the user and is used to prevent mobile IP allocation when a fraudulent user attempts to access a network using a cloned mobile communication terminal.

The hash value generation part 140 generates a hash value from the user key inputted by the user key input part 130 and the ESN with a hash function, and sets the first and second variables to the generated hash value.

When the user key is input from the user key input part 130, the hash value generation part 140 of the mobile communication terminal processing module 100 generates a hash value from the user key and the ESN with a hash function such as HAMC-MD5 (Hashed Message Authentication Code with MD5). When the hash value is generated, the hash value generation part 140 sets the first and second variables to the generated hash value.

The IP registration request part 150 transmits an IP registration request message (RRQ) including the first and second variables to the HA of the mobile communication system.

In more detail, when the user attempts to access the network using the mobile communication terminal, the mobile communication terminal processing module 100 transmits the IP registration request message (RRQ) including the first and second variables to the HA of the mobile communication system by means of the IP registration request part 150 if the first and second variables are not 'NULL' or are newly set by the hash value generation part 140.

When an IP registration reply message (RRP) transmitted from the HA indicates 'register hash value', the hash value registration check part 160 stores network access identification information, which is predetermined between the mobile communication terminal and the HA, in the first variable and changes the third variable to 'TRUE'.

That is, when the HA receives the IP registration request message (RRQ) including the first and second variables from the mobile communication terminal, the HA performs a hash value registration process if the user key is not registered. If the user key is registered, the HA performs a user registration process for IP allocation to the mobile communication terminal. The operation of the HA will be described in detail.

When the user key is registered by the HA, the HA transmits the IP registration reply message (RRP) indicating 'registration of hash value' to the mobile communication terminal. When the IP registration reply message (RRP) is received, the hash value registration check part 160 of the mobile communication processing module 100 stores the network access identification information, which is predetermined between the mobile communication terminal and the HA, in the first variable and changes the third variable to 'TRUE'. The network access identification information is information based on providers, for example, an IP address for providing a mobile network access service, such as 'ESN@XXXX.com'.

Figure 3:
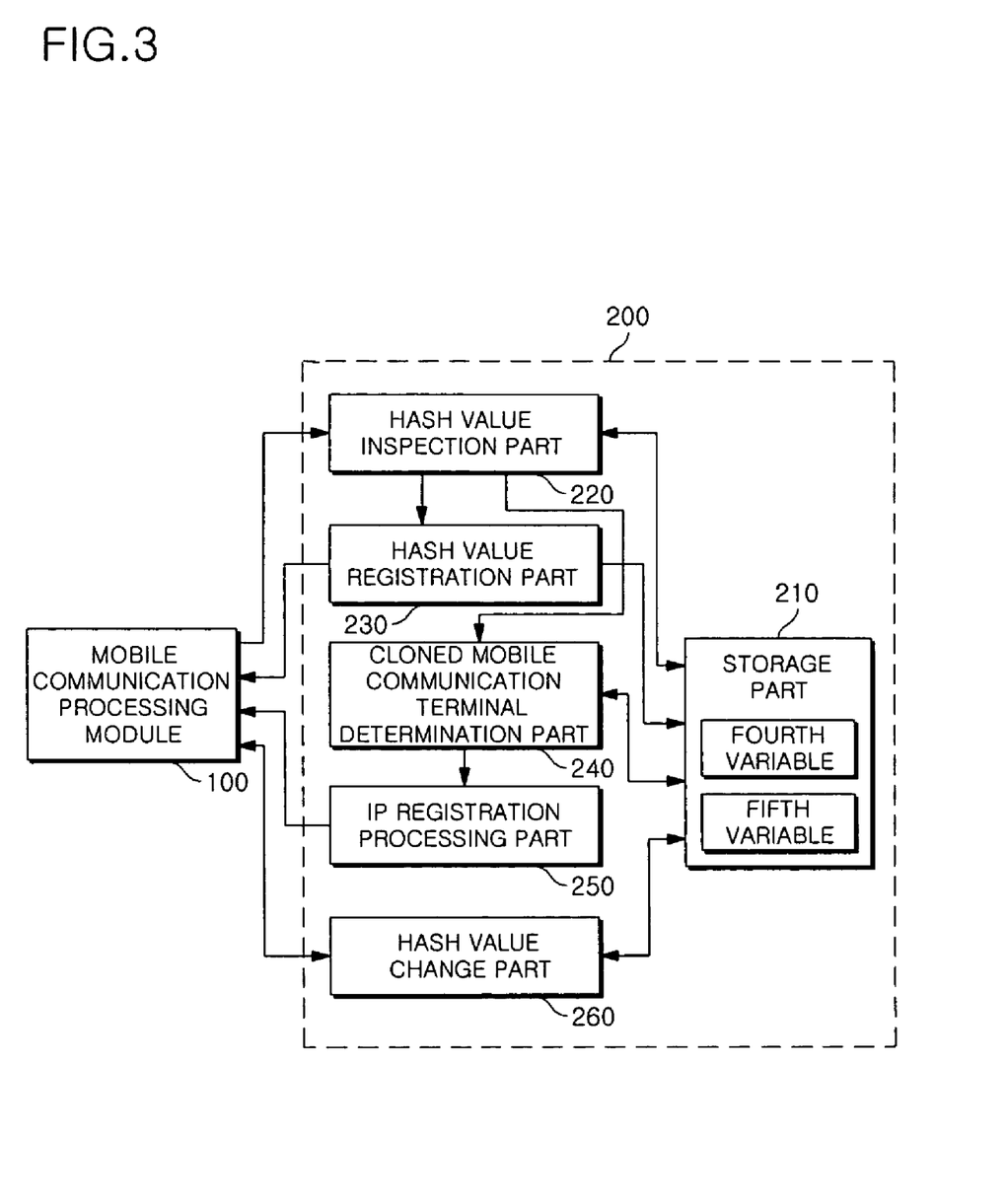
FIG. 3 is a block diagram of a home agent processing module in a system for preventing IP allocation to a cloned mobile communication terminal according to an embodiment of the present invention.

FIG. 3 is a block diagram of an HA processing module of a system for preventing IP allocation to a cloned mobile communication terminal according to an embodiment of the present invention.

The HA processing module 200 includes a storage part 210, a hash value inspection part 220, a hash value registration part 230, a cloned mobile communication terminal determination part 240, and an IP registration processing part 250.

The storage part 210 stores a fourth variable storing network access identification information, and a fifth variable storing a hash value.

When the user key is not registered, the fourth variable is set to predetermined network access identification information, for example, IP address for providing a mobile network access service, such as 'ESN@XXXX.com', and the fifth variable is set to 'NULL'.

The hash value inspection part 220 inspects the fifth variable stored in the storage part 210 when it receives the IP registration request message (RRQ) from the mobile communication terminal.

When the IP registration request message is received from the mobile communication terminal for network access, the HA processing module 200 inspects the fifth variable stored in the storage part 210 by means of the hash value inspection part 220 to check whether or not a hash value is registered. The fifth variable having 'NULL' implies that the hash value is not registered.

When the fifth value is determined by the hash value inspection part 220 to be 'NULL', the hash value registration part 230 sets the first variable included in the IP registration request message to the fifth value and transmits the IP registration reply message (RRP) indicating 'registration of hash value' to the mobile communication terminal.

If the fifth variable is determined by the hash value inspection part 220 to be 'NULL', i.e., if the hash value is not registered, the HA processing module 200 sets the first variable included in the IP registration request message (RRQ) to the fifth value by means of the hash value registration part 230, and transmits the IP registration reply message (RRP) indicating 'registration of hash value' to the mobile communication terminal.

When the fifth variable is not determined by the hash value inspection part 220 to be 'NULL', the cloned mobile communication terminal determination part 240 compares the first variable included in the IP registration request message and the fourth variable stored in the storage part 210 with the second variable included in the IP registration request message and the fifth variable stored in the storage part 210, respectively. If the variables match, the mobile communication terminal is determined as normal. If not, it is determined as cloned.

When the fifth variable is not determined by the hash value inspection part 220 to be 'NULL', i.e., when the hash value is registered, the cloned mobile communication terminal determination part 240 of the HA processing module 200 compares the first variable included in the IP registration request message and the fourth variable stored in the storage part with the second variable included in the IP registration request message and the fifth variable stored in the storage part, respectively. If the variables match, the mobile communication terminal is determined as normal. If not, it is determined as cloned.

That is, since a user key inputted by a fraudulent user attempting to access the network using a cloned mobile communication terminal is not generally equal to another user key inputted by a legitimate user of an original mobile communication terminal, hash values obtained by hashing the user key and the ESN with a hash function are generally not equal to each other. Accordingly, a hash value registered in the HA by the legitimate user and a hash value transmitted from the mobile communication terminal are compared with each other to determine whether or not the mobile communication terminal is cloned.

When a mobile communication terminal is determined as genuine by the cloned mobile communication determination part 240, the IP registration processing part 250 performs an IP registration process for the mobile communication terminal. When the mobile communication terminal is determined as cloned by the cloned mobile communication determination part 240, the IP registration processing part 250 does not perform an IP registration process for the mobile communication terminal.

If the mobile communication terminal is determined as genuine by the cloned mobile communication determination part 240, the HA processing module 200 performs an IP registration process for the mobile communication terminal by means of the IP registration processing part 250, such that an available IP address is allocated to the mobile communication terminal. If the mobile communication terminal is determined as cloned by the cloned mobile communication determination part 240, the HA processing module 200 does not perform an IP registration process for the mobile communication terminal by means of the IP registration processing part 250, such that an IP address is not allocated to the mobile communication terminal. The above-mentioned IP registration process in the IP registration processing part 250 is well known in the art and a detailed description thereof will thus be omitted herein.

Accordingly, the system for preventing IP allocation to a cloned mobile communication terminal according to the present invention generates a hash value necessary for user authentication during a mobile IP registration process using a user key known only to a legitimate user and registers the hash value in the HA of the mobile communication system, such that the hash value cannot be copied to the cloned mobile communication terminal and an IP address cannot be allocated to the cloned mobile communication terminal.

A process of registering a hash value and a process of preventing IP allocation to a cloned mobile communication terminal in a system for preventing IP allocation to the cloned mobile communication terminal according to an embodiment of the present invention will be described in detail with reference to FIGS. 4 and 5.

Figure 4:
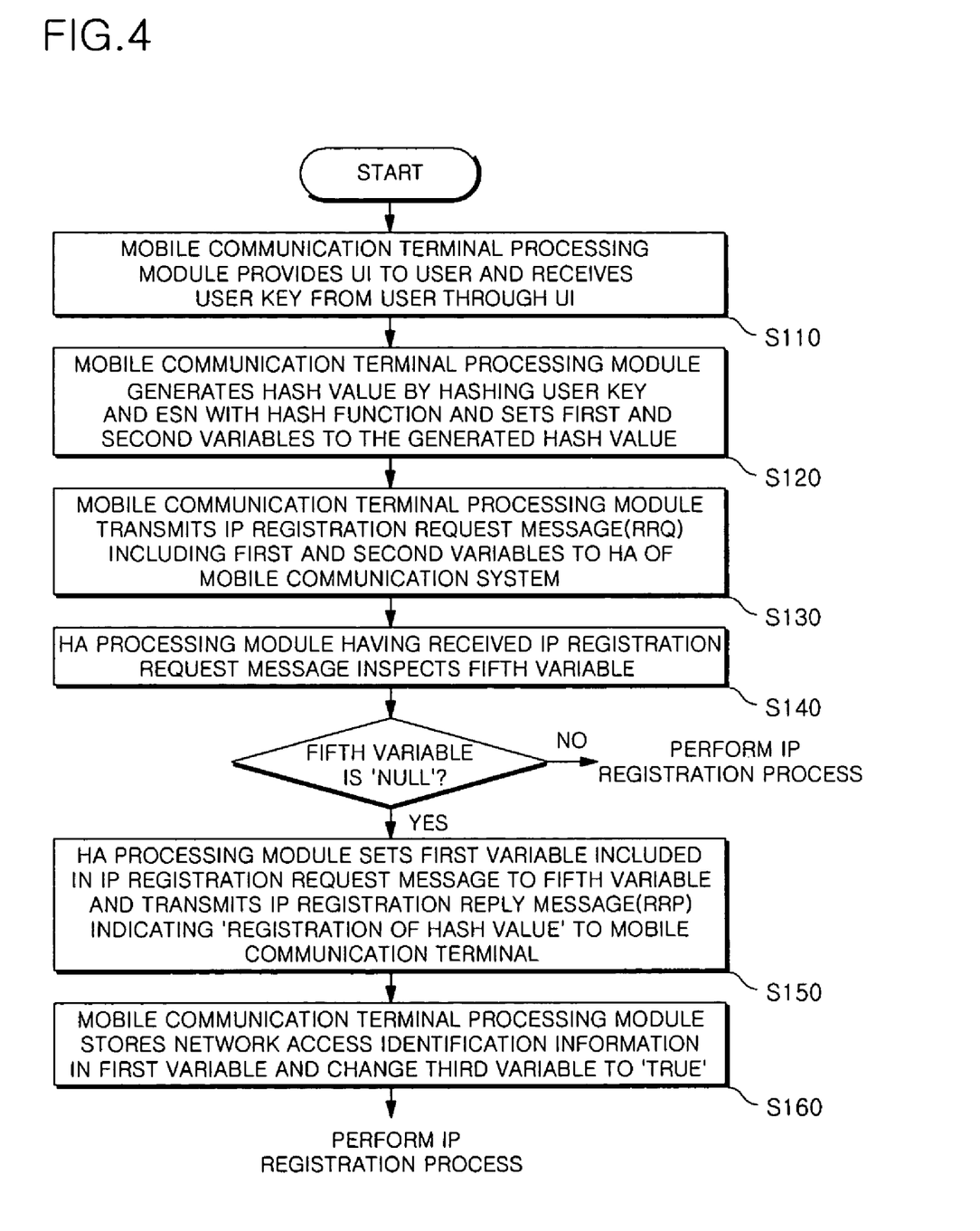
FIG. 4 is a flow chart of a method of registering a hash value in a system for preventing IP allocation to a cloned mobile communication terminal according to an embodiment of the present invention.

FIG. 4 is a flow chart of a process of registering a hash value in a system for preventing IP allocation to a cloned mobile communication terminal according to an embodiment of the present invention.

A mobile communication terminal has the storage part 110 of the mobile communication terminal processing module 100, which stores first and second variables initially set to 'NULL' and a third variable initially set to 'FALSE'. A fourth variable stored in the storage part 210 of the HA processing module 200 is set to predetermined network access identification information and a fifth variable is set to 'NULL'.

In operation S110, when a user attempts to access a network using a new mobile communication terminal, the mobile communication terminal processing module 100 provides user interface (UI) through the user key input part 130 and receives a user key from the user through the UI since the first and second variables are 'NULL'.

In operation S120, the mobile communication terminal processing module 100 generates a hash value from the user key inputted in operation S110 and an ESN by means of the hash value generation part 140, and sets the first and second variables to the generated hash value.

In operation S130, when the first and second variables are set to the hash value generated in operation S120, the IP registration request part 150 of the mobile communication terminal processing module 100 transmits an IP registration request message (RRQ) including the first and second variables to the HA of the mobile communication system.

In operation S140, when receiving the IP registration request message including the first and second variables from the mobile communication terminal, the HA processing module 200 inspects the fifth variable stored in the storage part 210 by means of the hash value inspection part 220.

The fifth variable is determined to be 'NULL' in operation S140. In operation S150, the hash value registration part 230 of the HA processing module 200 sets the first variable included in the IP registration request message and transmits an IP registration reply message (RRP) indicating 'registration of hash value' to the mobile communication terminal.

In operation S160, when receiving the IP registration reply message indicating 'register hash value', the hash value registration check part 160 of the mobile communication terminal processing module 100 stores network access identification information, which is predetermined between the mobile communication terminal and the HA, in the first variable, and changes the third variable to 'TRUE', thereby completing a hash value registration process.

Once the hash value registration process is completed, the user can access the network using the mobile communication terminal and be allocated IP from the HA.

Figure 5:
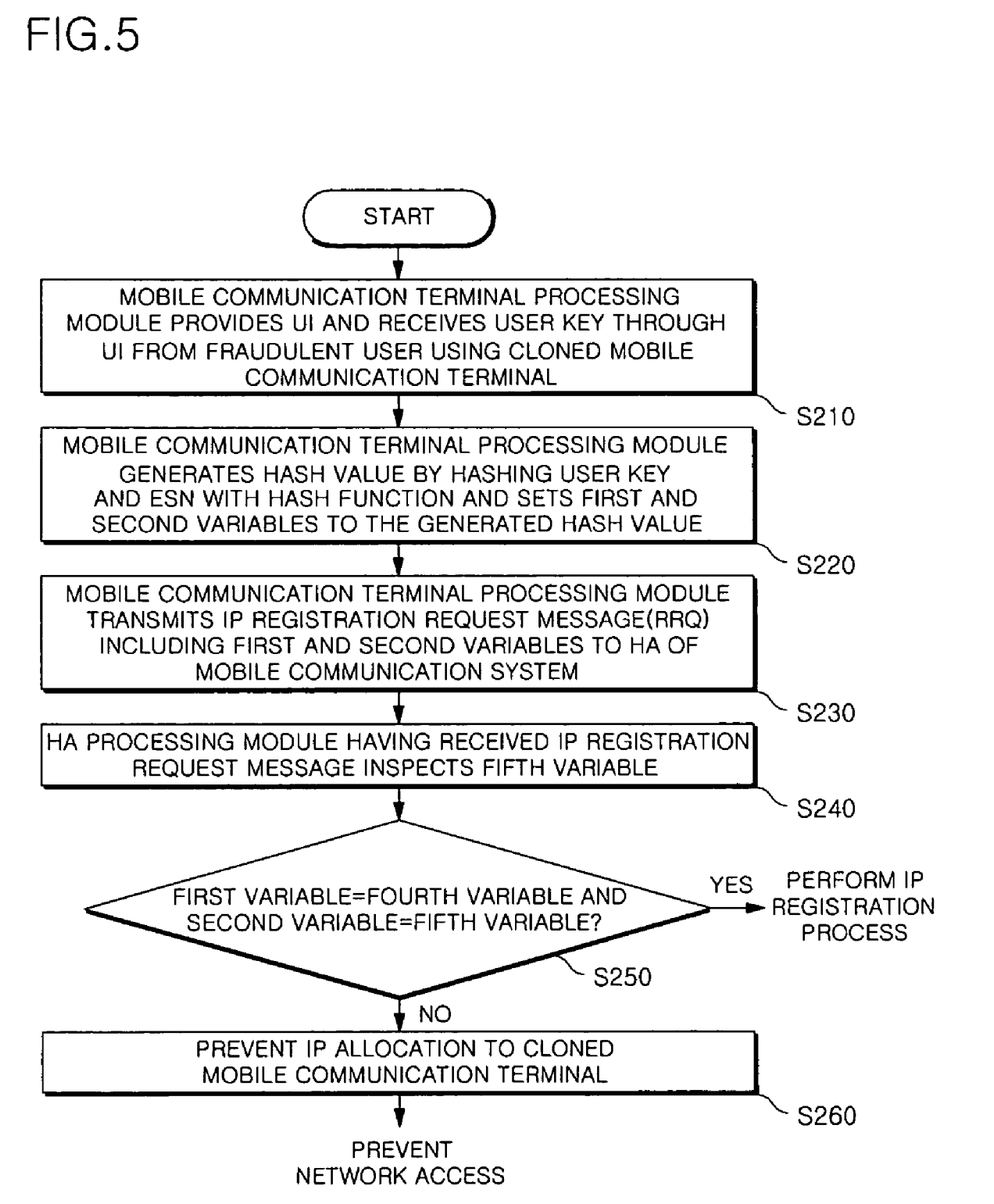
FIG. 5 is a flow chart of operation of preventing IP allocation to a cloned mobile communication terminal in a system for preventing IP allocation to the cloned mobile communication terminal according to an embodiment of the present invention.

FIG. 5 is a flow chart of operation of preventing IP allocation to a cloned mobile communication terminal in a system for preventing IP allocation to the cloned mobile communication terminal according to an embodiment of the present invention.

In a cloned mobile communication terminal, the storage part 110 of the mobile communication terminal processing module 100 stores first and second variables set to 'NULL', and a third variable set to 'FALSE'. The storage part 210 of the HA processing module 200 stores a fourth variable set to predetermined network access identification information, and a fifth variable set to the hash value.

In operation S210, when the cloned mobile communication terminal accesses a network, the mobile communication terminal processing module 100 provides user interface (UI) by means of the user key input part 130 and receives a user key from the cloned mobile communication terminal through the UI since the first and second variables are 'NULL'.

In operation S220, the hash value generation part 140 of the mobile communication terminal processing module 100 generates a hash value from the user key inputted in operation S210 and an ESN with a hash function, and sets the first and second variables to the generated hash value.

In operation S230, when the first and second variables are set to the generated hash value in operation S220, the mobile communication processing module 100 transmits an IP registration request message (RRQ) including the first and second variables to the HA by means of the IP registration request part 150.

In operation S240, when the IP registration request message including the first and second variables is received from the mobile communication terminal, the HA processing module 200 inspects the fifth variable stored in the storage part 210 by means of the hash value inspection part 220.

The fifth variable is determined to be the hash value in operation S240. In operation S250, the cloned mobile communication terminal determination part 240 of the HA processing module 200 compares the first variable included in the IP registration request message and the fourth variable stored in the storage part with the second variable included in the IP registration request message and the fifth variable stored in the storage part, respectively.

The first and second variables are hash values obtained by hashing a user key inputted by a fraudulent user using a cloned mobile communication terminal and an ESN with a hash function, the fourth variable is set to predetermined network access identification information, and the fifth variable is set to a hash value inputted by a normal user. Thus, as the result of comparison in operation S250, the variables do not match, such that the mobile communication terminal is determined as cloned. Thus, in operation S260, the IP registration processing part 250 of the HA processing module 200 does not perform an IP registration process, thereby preventing IP allocation to the cloned mobile communication terminal.

Accordingly, the system for preventing IP allocation to a cloned mobile communication terminal according to the present invention generates a hash value necessary for user authentication during a mobile IP registration process from a user key known only to a legitimate user and registers the hash value in the HA of the mobile communication system, such that the hash value cannot be copied to the cloned mobile communication terminal and an IP address cannot be allocated to the cloned mobile communication terminal.

In another embodiment, the mobile communication terminal processing module 100 may further include a hash value processing part 170, and the HA processing module 200 may further include a hash value change part 260.

The hash value processing part 170 determines whether or not the third variable is 'TRUE' when a user requests a change of a hash value from the hash value processing part 170. If the third variable is 'TRUE', the hash value processing part 170 provides user interface (UI) to the user and receives a user key from the user through the UI. When the user key and the second variable match, the hash value processing part 170 sets the first variable to the second variable, transmits the IP registration request message (RRQ) including the first and second variables to the HA, and requests the HA to change the hash value.

When the first variable included in the IP registration request message received from the mobile communication terminal and the fifth variable match, the hash value change part 260 changes the fifth variable to 'NULL', and transmits an IP registration reply message (RRP) indicating 'approval of change of hash value' to the mobile communication terminal.

In another embodiment, according to the IP registration reply message (RRP) indicating 'approval of change of hash value' transmitted from the HA, the hash value processing part 170 further provides user interface (UI) to a user, receives a user key from the user through the UI, generates a hash value by hashing the user key and the ESN with a hash function, sets the first and second variables to the generated hash value, and sets the third variable to 'FALSE'.

In another embodiment, the hash value processing part 170 further transmits the IP registration request message (RRQ) including the first and second variables to the HA of the mobile communication system, and, if the IP registration reply message (RRP) transmitted from the HA is a message indicating 'register hash value', stores network access identification information, which is determined between the mobile communication terminal and the HA, in the first variable, and changes the third variable to 'TRUE', thereby completing a new hash value registration process.

In another embodiment, when the hash value change part 260 receives the IP registration request message (RRQ) from the mobile communication terminal, the hash value change part 260 further inspects the fifth variable, and, if the fifth variable is 'NULL', sets the first variable included in the IP registration request message (RRQ) to the fifth variable, and transmits the IP registration reply message (RRP) indicating 'registration of hash value' to the mobile communication terminal.

Figure 6A:
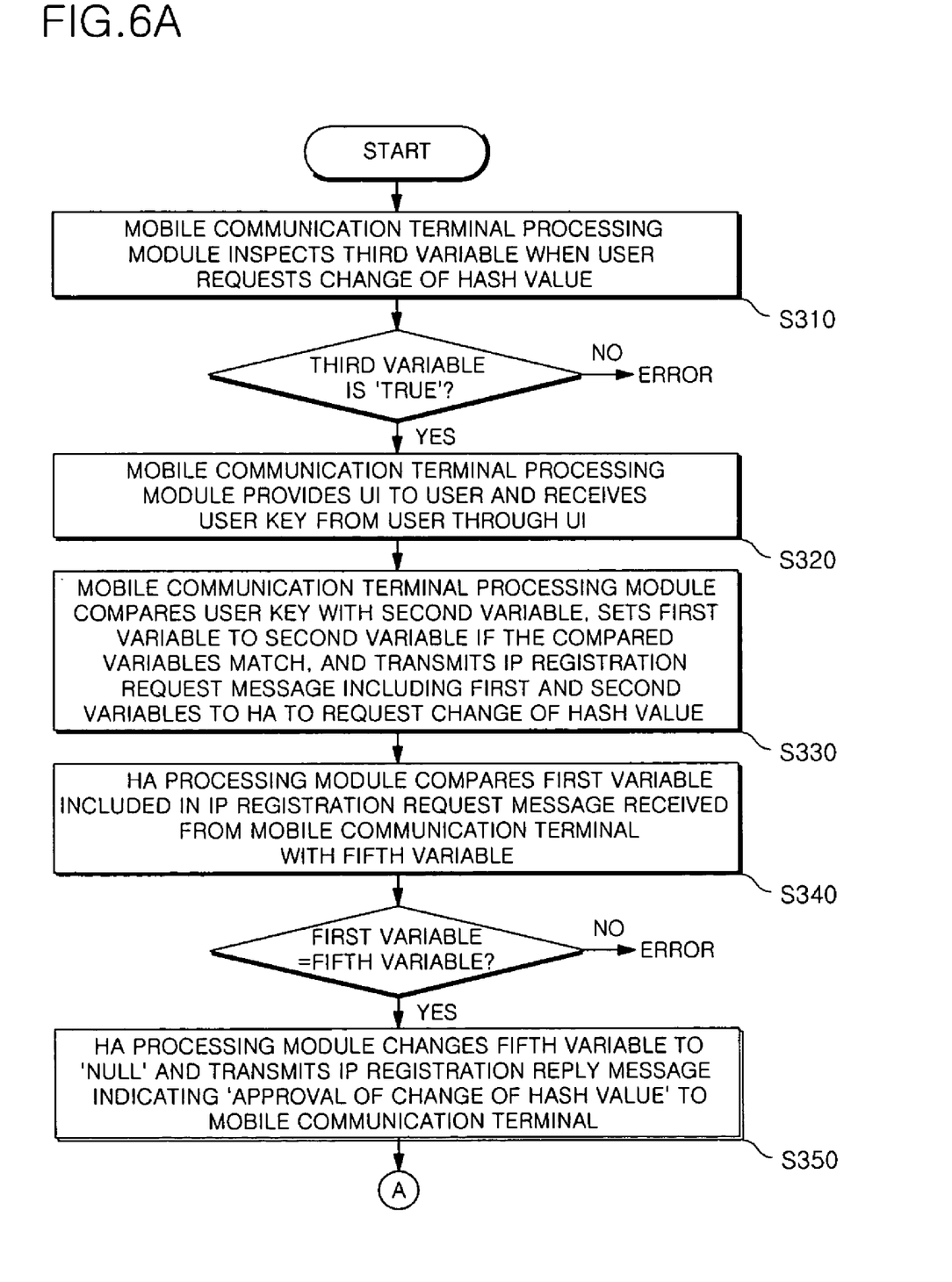
FIGS. 6A and 6B are flow charts of a method of changing a hash value in a system for preventing IP allocation to a cloned mobile communication terminal according to an embodiment of the present invention.
Figure 6B:
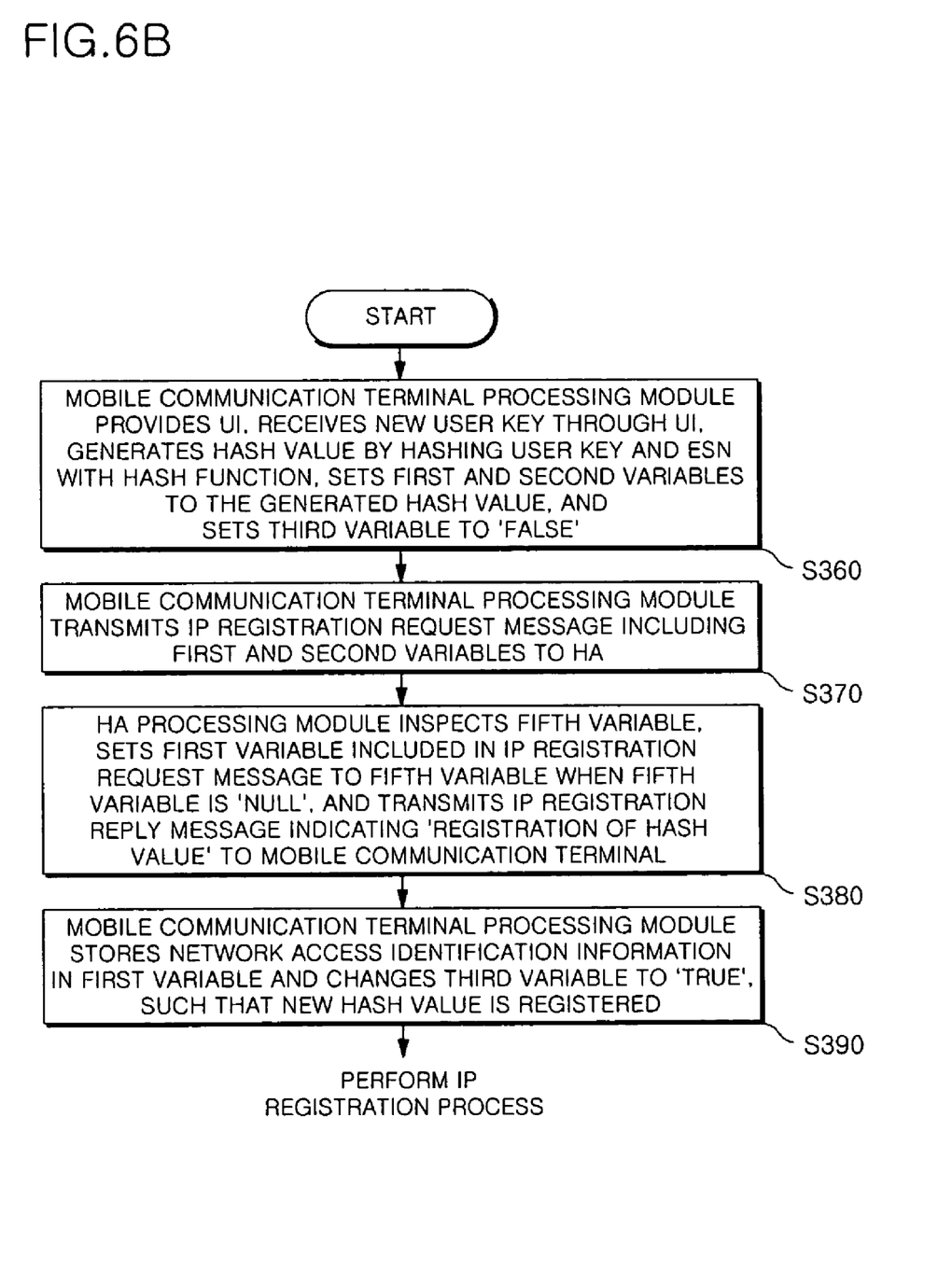

FIGS. 6A and 6B are flow charts of a method of changing a hash value in a system for preventing IP allocation to a cloned mobile communication terminal according to an embodiment of the present invention.

Once a hash value is registered, the mobile communication terminal processing module 100 has a storage part 110 storing a first variable that is set to predetermined network access identification information, a second variable that is set to a hash value, and a third variable that is set to 'TRUE'. The HA processing module 200 has a storage part 210 storing a fourth variable that is set to predetermined network access identification information, and a fifth variable that is set to a hash value.

In operation S310, when a user requests the mobile communication terminal processing module 100 to change a hash value, the mobile communication terminal processing module 100 inspects the third variable stored in the storage part 110 by means of the hash value processing part 170.

In operation S320, since the third variable is set to 'TRUE', the mobile communication terminal processing module 100 provides user interface (UI) to the user and receives a user key from the user through the UI by means of the hash value processing part 170.

In operation S330, when the user key inputted through the hash value processing part 170 and the second variable match, the mobile communication terminal processing module 100 sets the first variable to the second variable, transmits the IP registration request message including the first and second variables to the HA, and requests the HA to change the hash value.

In operation S340, the HA processing module 200 having received the IP registration request message compares the first variable included in the IP registration request message with the fifth variable by means of the hash value change part 260.

Since the fifth variable is set to the hash value, the first variable and the fifth variable match. Thus, in operation S350, the HA processing module 200 changes the fifth variable to 'NULL' by means of the hash value change part 260, and transmits the IP registration reply message (RRP) indicating 'approval of change of hash value' to the mobile communication terminal.

The mobile communication terminal processing module 100 receives the IP registration reply message (RRP) indicating 'approval of change of hash value' from the HA and performs by means of the hash value processing part 170 the same process as performed when the hash value is registered upon purchasing the mobile communication terminal.

That is, in operation S360, the hash value processing part 170 of the mobile communication terminal processing module 100 provides UI to a user, receives a user key from the user through the UI, generates a hash value by hashing the user key and the ESN with a hash function, sets the first and second variables to the generated hash value, and sets the third variable to 'FALSE'.

In operation S370, the hash value processing part 170 of the mobile communication terminal processing module 100 transmits the IP registration request message (RRQ) including the first and second variables to the HA of the mobile communication system.

In operation S380, when the IP registration request message (RRQ) including the first and second variables is received from the mobile communication terminal, the hash value change part 260 of the HA processing module 200 inspects the fifth variable, and, if the fifth variable is 'NULL', sets the first variable included in the IP registration request message to the fifth variable, and transmits the IP registration reply message (RRP) indicating 'registration of hash value' to the mobile communication terminal.

In operation S390, when the IP registration reply message indicating 'registration of hash value' is received from the HA, the hash value processing part 170 of the mobile communication terminal processing module 200 stores network access identification information, which is predetermined between the mobile communication terminal and the HA, in the first variable, and changes the third variable to 'TRUE', thereby completing registration of a new hash value.

In another embodiment, input data processed by the hash function may further include a MIN (Mobile Identification Number).

That is, in addition to the user key and the ESN, the MIN is used as input data of the hash function to generate a more reliable hash value.

In another embodiment, the input data processed by the hash function may further include a MDN (Mobile Directory Number) for identifying mobile communication terminals in a provider's network and a roaming partner's network.

That is, in addition to the user key and the ESN, the MDN is used as input data of the hash function to generate a more reliable hash value.

As apparent from the above description, the system for preventing IP allocation to a cloned mobile communication terminal according to the present invention generates a hash value necessary for user authentication during a mobile IP registration process from a user key known only to a legitimate user and registers the hash value in the HA of the mobile communication system, such that the hash value cannot be copied to the cloned mobile communication terminal and an IP address cannot be allocated to the cloned mobile communication terminal.

While the present invention has been described with reference to exemplary embodiments thereof, it will be understood by those skilled in the art that various changes in form and details may be made therein without departing from the scope of the present invention as defined by the following claims.

What is claimed is:

1. A system for preventing IP (Internet Protocol) allocation to a cloned mobile communication terminal, comprising:
  a mobile communication terminal to generate a first hash value obtained by hashing a user key inputted by a user and an ESN (Electronic Serial Number) with a hash function, and to transmit the first hash value to an HA (Home Agent) of a mobile communication system; and
  the HA to register the first hash value transmitted from the mobile communication terminal, to compare a second hash value included in an IP registration request message (RRQ) with the registered first hash value to perform an IP registration request of the mobile communication terminal, and to perform an IP registration process if the compared values match,
  wherein the mobile communication terminal includes a mobile communication terminal processing module, comprising:
  a storage part to store a first variable having network access identification information, a second variable having a hash value, and a third variable set to 'TRUE' or 'FALSE' according to whether or not the hash value is registered;
  an initialization part to set the first and second variables to 'NULL' and to set the third variable to 'FALSE' when the ESN is input;
  a user key input part to provide UI (User Interface) to the user and to receive the user key from the user through the UI when the first and second variables are set to 'NULL';
  a hash value generation part to generate the first hash value by hashing the user key inputted by the user key input part and the ESN with the hash function, and to set the first and second variables to the generated first hash value;
  an IP registration request part to transmit the IP registration request message (RRQ) including the first and second variables to the HA; and
  a hash value registration check part to store network access identification information, which is predetermined between the mobile communication terminal and the HA, in the first variable and to change the third variable to 'TRUE' when an IP registration reply message (RRP) transmitted from the HA is a message indicating 'registration of hash value'.

2. The system of claim 1, wherein the HA includes an HA processing module, comprising:
  a storage part to store a fourth variable having the network access identification information and a fifth variable having a hash value;
  a hash value inspection part to inspect the fifth variable when the IP registration request message is received from the mobile communication terminal;
  a hash value registration part to set the first variable included in the IP registration request message to the fifth variable when the fifth variable is determined to be 'NULL' by the hash value inspection part and to transmit the IP registration reply message indicating 'registration of hash value' to the mobile communication terminal;
  a cloned mobile communication terminal determination part to compare the first variable included in the IP registration request message and the fourth variable stored in the storage part with the second variable included in the IP registration request message and the fifth variable stored in the storage part, respectively, when the fifth variable is not determined to be 'NULL' by the hash value inspection part, and to determine the mobile communication terminal as normal if the compared variables match, or to determine the mobile communication terminal as cloned if the compared variables do not match; and an IP registration processing part to perform the IP registration process for the mobile communication terminal if the mobile communication terminal is determined as normal, or to deny the IP registration process for the mobile communication terminal if the mobile communication terminal is determined as cloned.

3. The system of claim 2, wherein the mobile communication terminal processing module further includes a hash value processing part to request a change of the first hash value at the hash value change request of the user when the third variable is determined to be 'TRUE' by providing UI (User Interface) to the user, to receive a registered user key from the user through the UI, to compare the inputted user key with the second variable, to set the first variable to the second variable if the user key and the second variable match, and to transmit the IP registration request message including the first and second variables to the HA of the mobile communication system.

4. The system of claim 3, wherein the HA processing module further includes a hash value change part to change the fifth variable to 'NULL' when the first variable included in the IP registration request message received from the mobile communication terminal and the fifth variable match, and to transmit an IP registration reply message indicating 'approval of change of hash value' to the mobile communication terminal.

5. The system of claim 4, wherein the hash value processing part further provides the UI to the user and receives a new user key from the user through the UI according to the IP registration reply message indicating 'approval of change of hash value' transmitted from the HA, generates a new first hash value by hashing the user key and the ESN with the hash function, sets the first and second variables to the generated new first hash value, and sets the third variable to 'FALSE'.

6. The system of claim 5, wherein the hash value processing part further transmits the IP registration request message including the first and second variables to the HA, and, if the IP registration reply message transmitted from the HA is the message indicating 'registration of hash value', stores the network access identification information, which is predetermined between the mobile communication terminal and the HA, in the first variable, and changes the third variable to 'TRUE'.

7. The system of claim 6, wherein when the hash value change part receives the IP registration request message from the mobile communication terminal, the hash value change part further inspects the fifth variable, sets the first variable included in the IP registration request message to the fifth variable when the fifth variable is 'NULL', and transmits the IP registration reply message indicating 'registration of hash value' to the mobile communication terminal.

8. The system of claim 1, wherein input data processed by the hash function further includes a MIN (Mobile Identification Number).

9. The system of claim 1, wherein input data processed by the hash function further includes a MON (Mobile Directory Number) for identifying the mobile communication terminal in a provider's network and a roaming partner's network.

10. The system of claim 1, wherein the hash function is HMAC-MD5 (Hashed Message Authentication Code with MD5).

* * * * *

UNITED STATES PATENT AND TRADEMARK OFFICE
CERTIFICATE OF CORRECTION

PATENT NO. : 7,636,845 B2  Page 1 of 1
APPLICATION NO. : 11/580741
DATED : December 22, 2009
INVENTOR(S) : Jeon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 483 days.

Signed and Sealed this

Ninth Day of November, 2010

David J. Kappos
*Director of the United States Patent and Trademark Office*